United States Patent
Harris, III

(10) Patent No.: US 10,045,310 B2
(45) Date of Patent: Aug. 7, 2018

(54) REGULATING TRANSMIT POWER OF SIGNAL SOURCES

(71) Applicant: HEWLETT-PACKARD DEVELOPMENT COMPANY, L.P., Houston, TX (US)

(72) Inventor: Otis Robert Harris, III, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 90 days.

(21) Appl. No.: 15/035,134

(22) PCT Filed: Nov. 26, 2013

(86) PCT No.: PCT/US2013/072020
§ 371 (c)(1),
(2) Date: May 6, 2016

(87) PCT Pub. No.: WO2015/080704
PCT Pub. Date: Jun. 4, 2015

(65) Prior Publication Data
US 2016/0295524 A1    Oct. 6, 2016

(51) Int. Cl.
*H04W 52/28*    (2009.01)
*H01Q 1/24*    (2006.01)
*H04B 1/3827*    (2015.01)
*H04L 12/26*    (2006.01)

(52) U.S. Cl.
CPC .......... *H04W 52/283* (2013.01); *H01Q 1/245* (2013.01); *H04B 1/3838* (2013.01); *H04L 43/16* (2013.01)

(58) Field of Classification Search
CPC .... H04W 52/283; H04L 43/16; H04B 1/3838; H01Q 1/245
See application file for complete search history.

(56) References Cited

U.S. PATENT DOCUMENTS

| | | |
|---|---|---|
| 5,564,086 A | 10/1996 | Cygan et al. |
| 7,113,087 B1 | 9/2006 | Casebolt et al. |
| 2003/0064761 A1 | 4/2003 | Nevermann |

(Continued)

FOREIGN PATENT DOCUMENTS

| | | |
|---|---|---|
| CN | 101166990 | 4/2008 |
| CN | 103380576 | 10/2013 |
| EP | 122964 | 8/2002 |

OTHER PUBLICATIONS

Ranta, T. et al.; "Antenna Tuning Approach Aids Cellular Handsets" Nov. 2008; 7 pages; http://www.psemi.com/articles/2008/2008_ar_1.pdf.

*Primary Examiner* — Mohammad S Anwar
(74) *Attorney, Agent, or Firm* — HPI Patent Department

(57) ABSTRACT

Example implementations relate to detecting human presence in proximity of a user device. In example implementations, a portion of a first signal may be provided by a first directional coupler that is communicatively coupled to an antenna. A portion of a second signal may be provided by a second directional coupler that is communicatively coupled to a signal source. Transmit power of the signal source may be regulated based on the signal portions provided by the first and second directional couplers.

15 Claims, 8 Drawing Sheets

(56) References Cited

U.S. PATENT DOCUMENTS

| | | | |
|---|---|---|---|
| 2004/0243326 A1* | 12/2004 | Daoud | G01R 27/04 |
| | | | 702/65 |
| 2010/0222010 A1* | 9/2010 | Ozaki | H02J 5/005 |
| | | | 455/77 |
| 2012/0190398 A1 | 7/2012 | Leukkunen et al. | |
| 2012/0282872 A1 | 11/2012 | Banwell et al. | |
| 2013/0016621 A1 | 1/2013 | Kil et al. | |
| 2013/0210477 A1* | 8/2013 | Peter | H04W 64/00 |
| | | | 455/522 |

\* cited by examiner

REGULATING TRANSMIT POWER OF SIGNAL SOURCES

BACKGROUND

Transmitters and antennas in electronic devices may facilitate communications with other electronic devices. An antenna of an electronic device may be electrically tuned to a specific frequency, and the input impedance of the antenna may be matched to the output impedance of a transmitter of the electronic device.

BRIEF DESCRIPTION OF THE DRAWINGS

The following detailed description references the drawings, wherein.

DETAILED DESCRIPTION

The Federal Communications Commission (FCC), an agency of the United States government, has set specific absorption rate (SAR) limits for electronic devices used by humans in the United States. SAR is a measure of the rate at which the human body absorbs energy. A user's body may absorb energy emitted by user devices such as mobile phones and tablet computing devices. As used herein, the term "user device" refers to a device capable of receiving input from a user and/or displaying information to a user. To comply with the FCC's SAR limits, user devices may be designed with circuitry to regulate transmit power of signal sources of the user devices. As used herein, the term "transmit power" refers to the power level of a transmitted signal. As used herein, the term "signal source" refers to a component that generates alternating current (AC) and/or direct current (DC) signals.

In light of the above, the present disclosure enables regulation of transmit power of a signal source of a user device based on whether human presence is detected in proximity of the user device. When a human body is in proximity to an antenna, the antenna may become detuned, which may result in an impedance mismatch between the antenna and the signal source with which it was matched. Also, power may be reflected back to the signal source from the antenna. The amount of power reflected back to the signal source may be used to detect human presence in proximity of the user device. Transmit power of the signal source may be maintained or increased when human presence is not detected, and may be decreased when human presence is detected. The reduction in transmit power may allow the user device to comply with the FCC's SAR limits.

Figure 1:
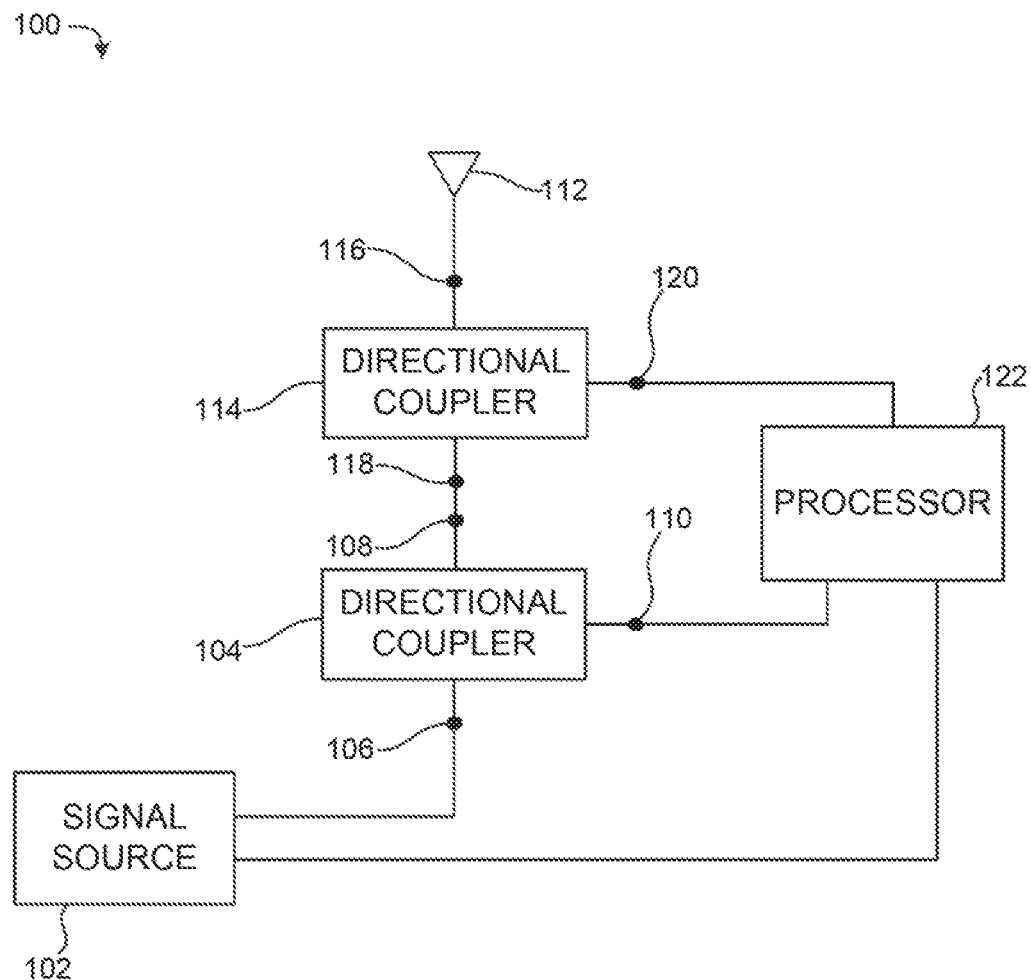
FIG. 1 is a block diagram of an example system for detecting human presence in proximity of a user device.

Referring now to the drawings, FIG. 1 is a block diagram of an example system 100 for detecting human presence in proximity of a user device. System 100 may be a user device, such as a notebook computer, a desktop computer, a workstation, a tablet computing device, a mobile phone, or an electronic book reader. In FIG. 1, system 100 includes signal source 102, directional coupler 104, directional coupler 114, antenna 112, and processor 122. As used herein, the terms "include", "have", and "comprise" are interchangeable and should be understood to have the same meaning. In some implementations, signal source 102 may include a radio transmitter chipset. In some implementations, a matching network may be placed in the signal path between signal source 102 and antenna 112 to facilitate impedance matching between signal source 102 and antenna 112.

Directional coupler 104 may have a first port 106, a second port 108, and a third port 110. Directional coupler 114 may have a first port 116, a second port 118, and a third port 120. As used herein, the term "directional coupler" or "coupler" refers to a device having a first port, a second port, and a third port such that a majority portion (e.g., in terms of power) of a signal entering the second port is provided at the first port, and the remaining portion is provided at the third port; signals entering at the first or third ports may be provided at the second port. First port 106 of directional coupler 104 may be communicatively coupled to signal source 102. First port 116 of directional coupler 114 may be communicatively coupled to antenna 112. Second port 108 of directional coupler 104 may be communicatively coupled to second port 118 of directional coupler 114. Third port 110 of directional coupler 104 and third port 120 of directional coupler 114 may be communicatively coupled to processor 122, which may also be communicatively coupled to signal source 102. A portion of a signal passing from second port 108 of coupler 104 to first port 106 of coupler 104 may be provided at third port 110 of coupler 104. A portion of a signal passing from second port 118 of coupler 114 to first port 116 of coupler 114 may be provided at third port 120 of coupler 114.

When a human is not in proximity to antenna 112, a negligible amount of power radiated by the antenna may be reflected back to signal source 102 (e.g., the amount of reflected power may be less than a tenth of the amount of power transmitted from the signal source). When a human is in proximity to antenna 112, the amount of power reflected back to signal source 102 may be much greater than the amount of power reflected when a human is not in proximity to antenna 112 (e.g., when a human is in proximity to the antenna, the amount of reflected power may be more than half of the amount of power transmitted from the signal source). The closer a human is to antenna 112, the closer the amount of power reflected back to signal source 102 may be to the power of a signal transmitted from signal source 102 to antenna 112.

The signal strength of the signal portion provided at third port 110 of coupler 104 may be directly proportional to how much power is reflected from antenna 112 to signal source 102. The signal strength of the signal portion provided at third port 120 of coupler 114 may be directly proportional to the amount of power transmitted from signal source 102 to antenna 112. Processor 122 may regulate transmit power of signal source 102 based on the signal portions at third port 110 of coupler 104 and third port 120 of coupler 114. For example, processor 122 may determine that the strength (e.g., in terms of power, voltage, and/or current) of the signal portion at third port 110 of coupler 104 is almost the same as that of the signal portion at third port 120 of coupler 114, and may conclude from such conditions that a human is close to antenna 112. Processor 122 may then reduce the transmit power of signal source 102 such that system 100 complies with the FCC's SAR limits. Processor 122 may include a central processing unit (CPU), microprocessor (e.g., semiconductor-based microprocessor), and/or other hardware device suitable for regulating transmit power of a signal source and analyzing signals provided by directional couplers.

Figure 2:
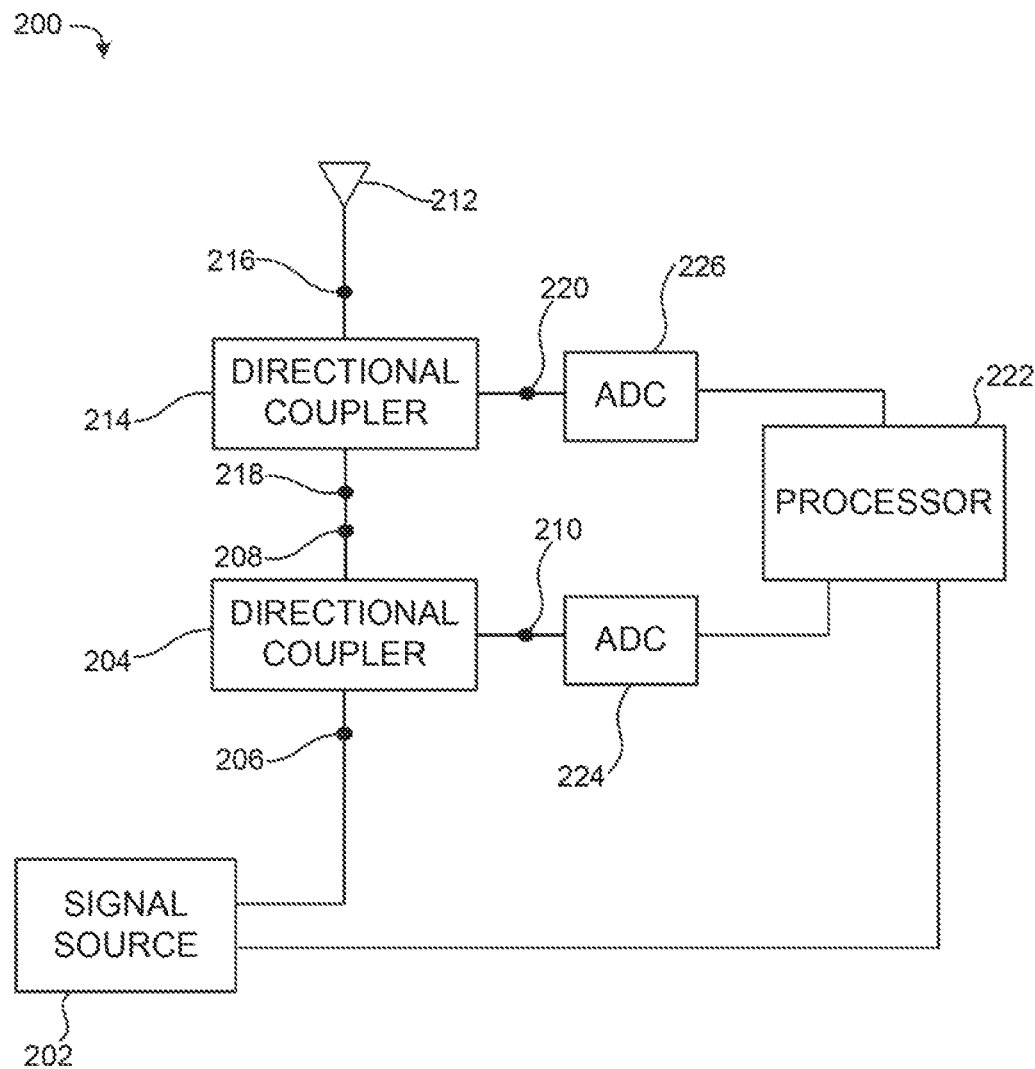
FIG. 2 is a block diagram of an example system for sampling voltages and determining whether to decrease transmit power of a signal source of a user device.

FIG. 2 is a block diagram of an example system 200 for sampling voltages and determining whether to decrease transmit power of a signal source of a user device. System 200 may be a user device, such as a notebook computer, a desktop computer, a workstation, a tablet computing device, a mobile phone, or an electronic book reader. In FIG. 2, system 200 includes signal source 202, directional coupler 204, directional coupler 214, antenna 212, analog-to-digital converter (ADC) 224, ADC 226, and processor 222. Processor 222 may include a CPU, microprocessor (e.g., semiconductor-based microprocessor), and/or other hardware device suitable for regulating transmit power of a signal source and analyzing signals provided by directional couplers. Signal source 202, coupler 204, coupler 214, and antenna 212 of FIG. 2 may be analogous to (e.g., have functions and/or components similar to) signal source 102, coupler 104, coupler 114, and antenna 112, respectively, of FIG. 1. Ports 206, 208, 210, 216, 218, and 220 of FIG. 2 may be analogous to ports 106, 108, 110, 116, 118, and 120, respectively, of FIG. 1. In some implementations, a matching network may be placed in the signal path between signal source 202 and antenna 212 to facilitate impedance matching between signal source 202 and antenna 212.

ADC 224 may be communicatively coupled to third port 210 of directional coupler 204 and to processor 222. ADC 224 may sample voltage of a signal portion at third port 210 of directional coupler 204. ADC 226 may be communicatively coupled to third port 220 of directional coupler 214 and to processor 222. ADC 226 may sample voltage of a signal portion at third port 220 of directional coupler 214. In some implementations, signal portions at third port 210 of directional coupler 204 and at third port 220 of directional coupler 214 may be rectified, amplified, and/or filtered before being sampled by the ADCs. For example, an amplifier may be placed between each third port and ADC in FIG. 2, and/or each ADC may have built-in rectification/amplification/filtering capabilities.

The signal portions sampled by ADCs 224 and 226 may be sinusoidal waves. ADCs 224 and 226 may sample the sinusoidal waves and convert them to digital signals made up of binary values (i.e., logical 1's and 0's). Processor 222 may receive the digital signals and store them (e.g., in a cache) at a predetermined rate (e.g., once a millisecond, every five milliseconds).

Processor 222 may store a first set of binary values, corresponding to voltage samples of the signal portion at third port 220 of coupler 214, and a second set of binary values, corresponding to voltage samples of the signal portion at third port 210 of coupler 204. The equivalent decimal value of a set of binary values may represent a sampled voltage value, and processor 222 may be programmed to correlate various binary values to respective voltage values. Processor 222 may correlate the first set of binary values to a forward voltage value, and correlate the second set of binary values to a reverse voltage value. The forward voltage value may be indicative of the amount of power in a signal transmitted from signal source 202 to antenna 212. The reverse voltage value may be indicative of the amount of power reflected back from antenna 212 to signal source 202.

Processor 222 may be communicatively coupled to signal source 202, and may regulate transmit power of signal source 202. In some implementations, processor 222 may regulate transmit power of signal source 202 based on the difference between the forward voltage value and the reverse voltage value. For example, processor 222 may decrease transmit power of signal source 202 if the difference between the forward voltage value and the reverse voltage value is less than a threshold value. A small difference (e.g., less than the threshold value) between the forward and reverse voltage values may indicate human presence near antenna 212, and thus the transmit power of signal source 202 may be decreased such that system 200 complies with the FCC's SAR limits. Processor 222 may maintain or increase transmit power of signal source 202 if the difference between the forward voltage value and the reverse voltage value is greater than the threshold value. The difference being greater than the threshold value may indicate absence of human presence near antenna 212, and thus the transmit power of signal source 202 may be above the FCC's SAR limits.

In some implementations, processor 222 may calculate a voltage standing wave ratio (VSWR) using the forward voltage value and the reverse voltage value. The VSWR may be calculated by dividing the sum of the forward and reverse voltage values by the difference between the forward and reverse voltage values. Processor 222 may regulate transmit power of signal source 202 based on the value of the VSWR. For example, processor 222 may decrease transmit power of signal source 202 if the VSWR exceeds a threshold value. The VSWR may be large (e.g., greater than the threshold value) when the forward and reverse voltage values are about the same, which may indicate human presence near antenna 212, and thus the transmit power of signal source 202 may be decreased such that system 200 complies with the FCC's SAR limits. Processor 222 may maintain or increase transmit power of signal source 202 if the VSWR does not exceed the threshold value. The VSWR being less than the threshold value (e.g., because the forward voltage value is much greater than the reverse voltage value) may indicate absence of human presence near antenna 212, and thus the transmit power of signal source 202 may be above the FCC's SAR limits.

It should be understood that discussions in the present disclosure related to voltage sampling, operations performed using sampled voltages, and actions performed based on such operations may be applicable to other aspects of a signal, such as current and power. For example, ADCs 224 and 226 may sample current (rather than voltage) of signal portions at third ports 210 and 220. Regulation of transmit power of signal source 202 may be based on a standing wave ratio defined in terms of current or power.

Figure 3:
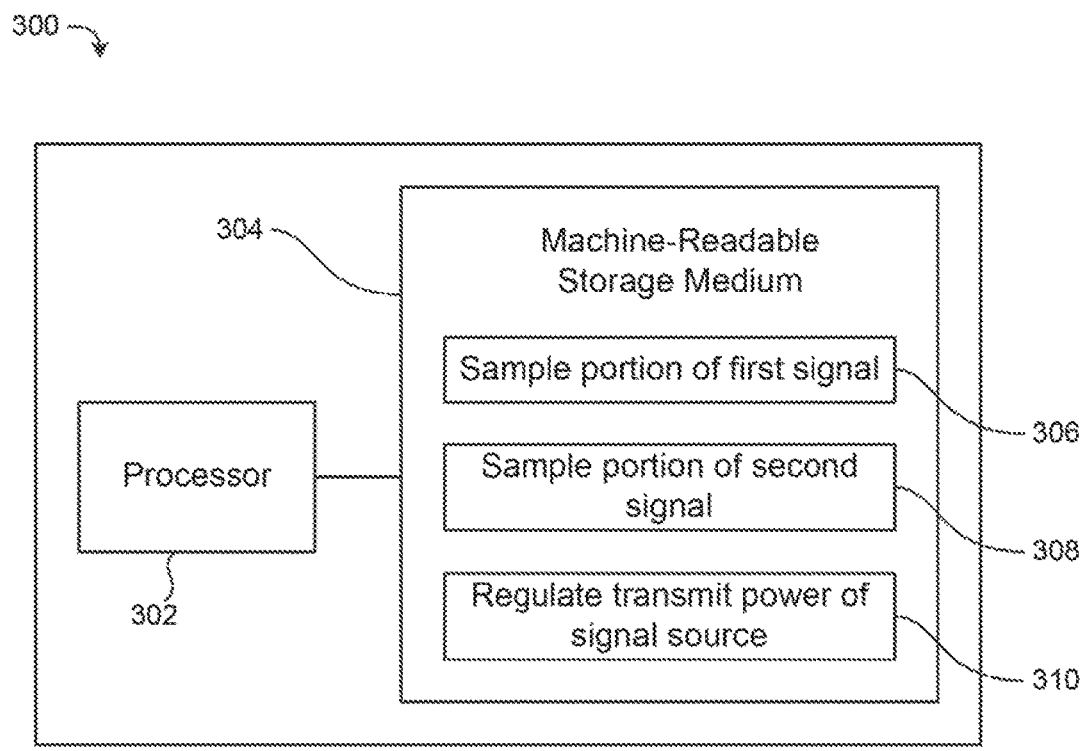
FIG. 3 is a block diagram of an example user device that includes a machine-readable storage medium encoded with instructions that enable detecting human presence in proximity of the user device.

FIG. 3 is a block diagram of an example user device 300 that includes a machine-readable storage medium encoded with instructions that enable detecting human presence in proximity of the user device. User device 300 may be a notebook computer, a desktop computer, a workstation, a tablet computing device, a mobile phone, or an electronic book reader. In FIG. 3, user device 300 includes processor 302 and machine-readable storage medium 304.

Processor 302 may include a CPU, microprocessor (e.g., semiconductor-based microprocessor), and/or other hardware device suitable for retrieval and/or execution of instructions stored in machine-readable storage medium 304. Processor 302 may fetch, decode, and/or execute instructions 306, 308, and 310 to enable detecting human presence in proximity of user device 300, as described below. As an alternative or in addition to retrieving and/or executing instructions, processor 302 may include an electronic circuit comprising a number of electronic components for performing the functionality of instructions 306, 308, and/or 310. Processor 302 may be implemented as processor 122 of FIG. 1 or processor 222 of FIG. 2.

Machine-readable storage medium 304 may be any suitable electronic, magnetic, optical, or other physical storage device that contains or stores executable instructions. Thus, machine-readable storage medium 304 may include, for example, a random-access memory (RAM), an Electrically Erasable Programmable Read-Only Memory (EEPROM), a storage device, an optical disc, and the like. In some implementations, machine-readable storage medium 304 may include a non-transitory storage medium, where the term "non-transitory" does not encompass transitory propagating signals. As described in detail below, machine-readable storage medium 304 may be encoded with a set of executable instructions 306, 308, and 310.

Instructions 306 may sample a portion of a first signal transmitted from a signal source to an antenna of user device 300. The portion of the first signal may be provided by a first directional coupler (e.g., coupler 114 of FIG. 1). Voltage, current, and/or other aspects of the portion of the first signal may be sampled.

Instructions 308 may sample a portion of a second signal reflected from the antenna to the signal source of user device 300. The portion of the second signal may be provided by a second directional coupler (e.g., coupler 104 of FIG. 1). Voltage, current, and/or other aspects of the portion of the second signal may be sampled.

Instructions 310 may regulate, based on the sampled portions of the first and second signals, transmit power of the signal source. For example, instructions 310 may determine that the strength (e.g., in terms of power, voltage, and/or current) of the signal portion provided by the second directional coupler is almost the same as that of the signal portion provided by the first directional coupler, and may conclude from such conditions that a human is close to user device 300. Instructions 310 may then reduce the transmit power of a signal source of user device 300 such that user device 300 complies with the FCC's SAR limits.

Figure 4:
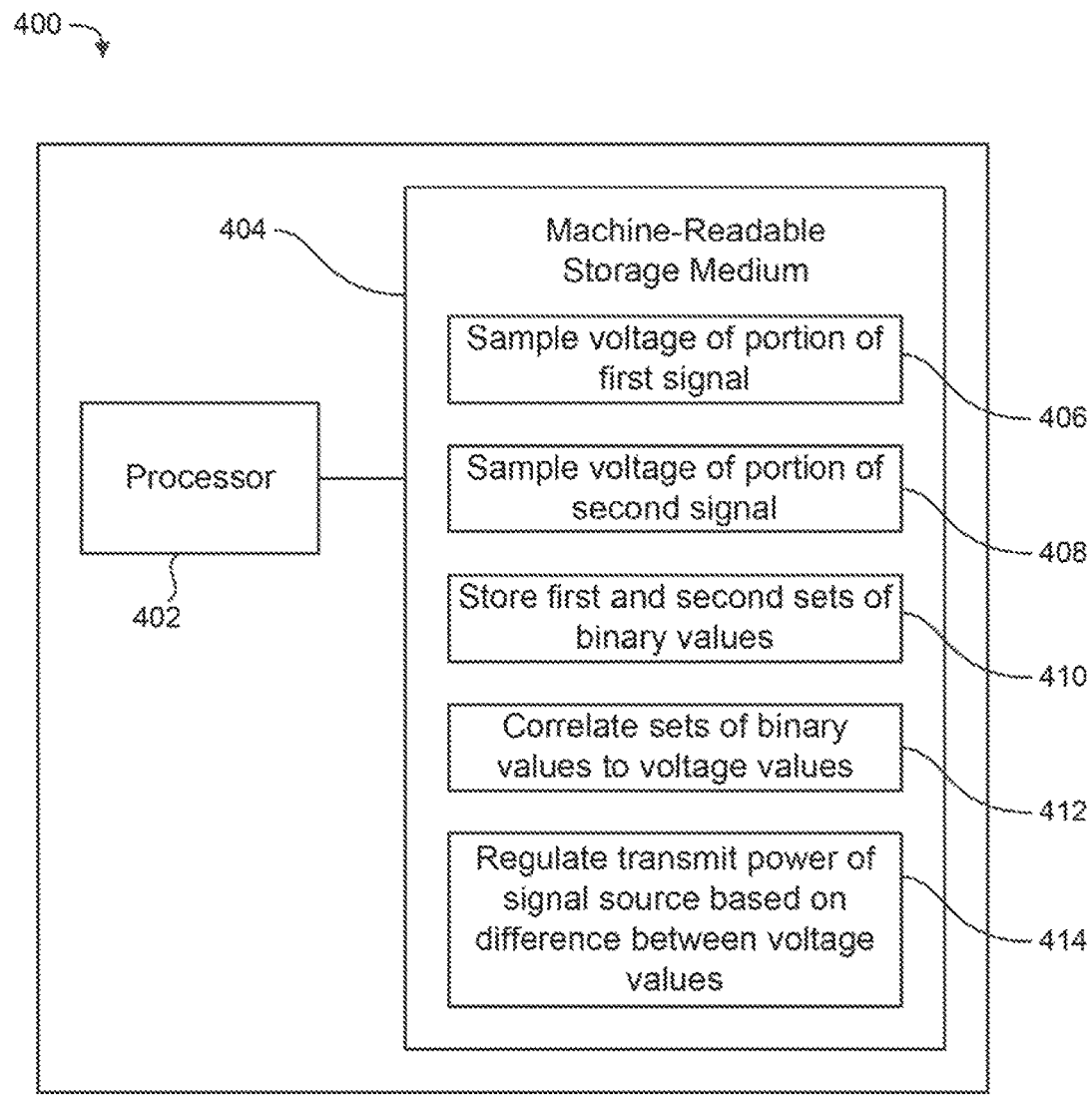
FIG. 4 is a block diagram of an example user device that includes a machine-readable storage medium encoded with instructions that enable regulation of transmit power of a signal source of the user device based on a difference between sampled voltage values.

FIG. 4 is a block diagram of an example user device 400 that includes a machine-readable storage medium encoded with instructions that enable regulation of transmit power of a signal source of the user device based on a difference between sampled voltage values. User device 400 may be a notebook computer, a desktop computer, a workstation, a tablet computing device, a mobile phone, or an electronic book reader. In FIG. 4, user device 400 includes processor 402 and machine-readable storage medium 404.

As with processor 302 of FIG. 3, processor 402 may include a CPU, microprocessor (e.g., semiconductor-based microprocessor), and/or other hardware device suitable for retrieval and/or execution of instructions stored in machine-readable storage medium 404. Processor 402 may fetch, decode, and/or execute instructions 406, 408, 410, 412, and 414 to enable regulation of transmit power of a signal source of user device 400, as described below. As an alternative or in addition to retrieving and/or executing instructions, processor 402 may include an electronic circuit comprising a number of electronic components for performing the functionality of instructions 406, 408, 410, 412, and/or 414. Processor 402 may be implemented as processor 122 of FIG. 1 or processor 222 of FIG. 2.

As with machine-readable storage medium 304 of FIG. 3, machine-readable storage medium 404 may be any suitable physical storage device that stores executable instructions. Instructions 406 may sample voltage of a portion of a first signal. The first signal may be transmitted from a signal source to an antenna of user device 400. The portion of the first signal may be provided by a first directional coupler (e.g., coupler 214).

Instructions 408 may sample voltage of a portion of a second signal. The second signal may be reflected from the antenna to the signal source of user device 400. The portion of the second signal may be provided by a second directional coupler (e.g., coupler 204).

Instructions 410 may store a first set of binary values, corresponding to voltage samples of the portion of the first signal, and a second set of binary values, corresponding to voltage samples of the portion of the second signal. The equivalent decimal value of a set of binary values may represent a sampled voltage value. An equivalent decimal value may or may not be equal to its respective sampled voltage value, depending on the method(s) of sampling used by instructions 406 and 408.

Instructions 412 may correlate the first set of binary values to a forward voltage value, and correlate the second set of binary values to a reverse voltage value. The forward voltage value may be indicative of the amount of power in a signal transmitted from a signal source to an antenna of user device 400. The reverse voltage value may be indicative of the amount of power reflected back from the antenna to the signal source.

Instructions 414 may regulate transmit power of the signal source based on a difference between the forward and reverse voltage values. For example, instructions 414 may decrease transmit power of the signal source if the difference between the forward voltage value and the reverse voltage value is less than a threshold value. In some implementations, instructions 414 may decrease transmit power of the signal source if the difference between the forward voltage value and the reverse voltage value is equal to the threshold value. A small difference (e.g., less than the threshold value) between the forward and reverse voltage values may indicate human presence near user device 400, and thus the transmit power of the signal source may be decreased such that user device 400 complies with the FCC's SAR limits. Instructions 414 may maintain or increase transmit power of the signal source if the difference between the forward voltage value and the reverse voltage value exceeds the threshold value. The difference being greater than the threshold value may indicate absence of human presence near user device 400, and thus the transmit power of the signal source may be above the FCC's SAR limits.

Figure 5:
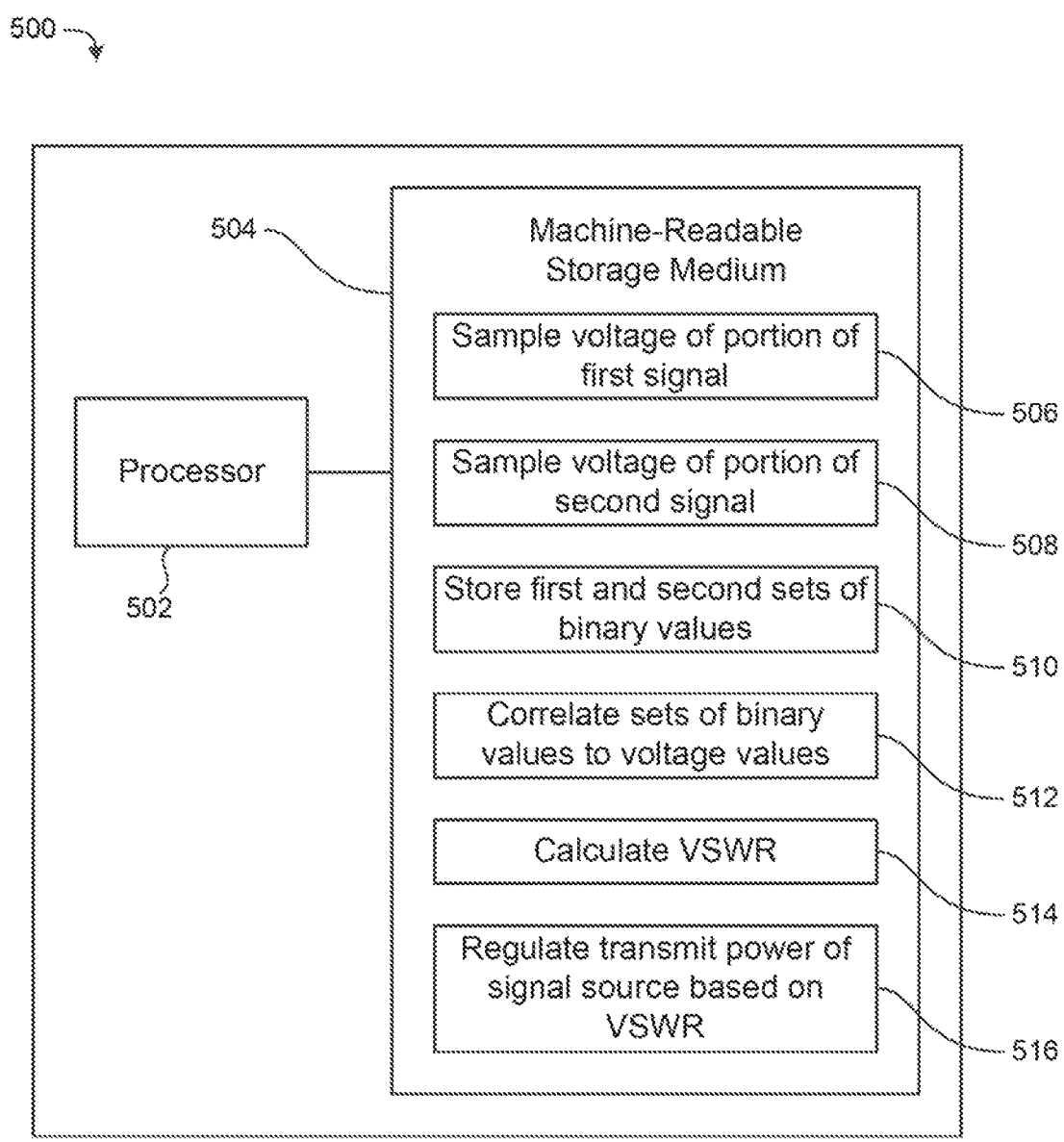
FIG. 5 is a block diagram of an example user device that includes a machine-readable storage medium encoded with instructions that enable regulation of transmit power of a signal source of the user device based on a voltage standing wave ratio.

FIG. 5 is a block diagram of an example user device 500 that includes a machine-readable storage medium encoded with instructions that enable regulation of transmit power of a signal source of the user device based on a VSWR. User device 500 may be a notebook computer, a desktop computer, a workstation, a tablet computing device, a mobile phone, or an electronic book reader. In FIG. 5, user device 500 includes processor 502 and machine-readable storage medium 504.

As with processor 402 of FIG. 4, processor 502 may include a CPU, microprocessor (e.g., semiconductor-based microprocessor), and/or other hardware device suitable for retrieval and/or execution of instructions stored in machine-readable storage medium 404. Processor 502 may fetch, decode, and/or execute instructions 506, 508, 510, 512, 514, and 516 to enable regulation of transmit power of a signal source of user device 500, as described below. As an alternative or in addition to retrieving and/or executing instructions, processor 502 may include an electronic circuit comprising a number of electronic components for performing the functionality of instructions 506, 508, 510, 512, 514, and/or 516. Processor 502 may be implemented as processor 122 of FIG. 1 or processor 222 of FIG. 2.

As with machine-readable storage medium 404 of FIG. 4, machine-readable storage medium 504 may be any suitable physical storage device that stores executable instructions. Instructions 506, 508, 510, and 512 on machine-readable storage medium 504 may be analogous to instructions 406, 408, 410, and 412 on machine-readable storage medium 404. Instructions 514 may calculate a VSWR using a forward voltage value and a reverse voltage value. The forward voltage value and the reverse voltage value may correspond to a first and second set of binary values, respectively, analogous to those discussed above with respect to FIG. 4. In some implementations, the VSWR may be calculated by dividing the sum of the forward and reverse voltage values by the difference between the forward and reverse voltage values.

Instructions 516 may regulate transmit power of a signal source of user device 500 based on the VSWR calculated by instructions 514. For example, instructions 516 may decrease transmit power of the signal source if the VSWR exceeds a threshold value. In some implementations, instructions 516 may decrease transmit power of the signal source if the VSWR is equal to the threshold value. The VSWR may be large (e.g., greater than the threshold value) when the forward and reverse voltage values are about the same, which may indicate human presence near user device 500, and thus the transmit power of the signal source may be decreased such that user device 500 complies with the FCC's SAR limits. Instructions 516 may maintain or increase transmit power of the signal source if the VSWR does not exceed the threshold value. The VSWR being less than the threshold value (e.g., because the forward voltage value is much greater than the reverse voltage value) may indicate absence of human presence near user device 500, and thus the transmit power of the signal source may be above the FCC's SAR limits.

Figure 6:
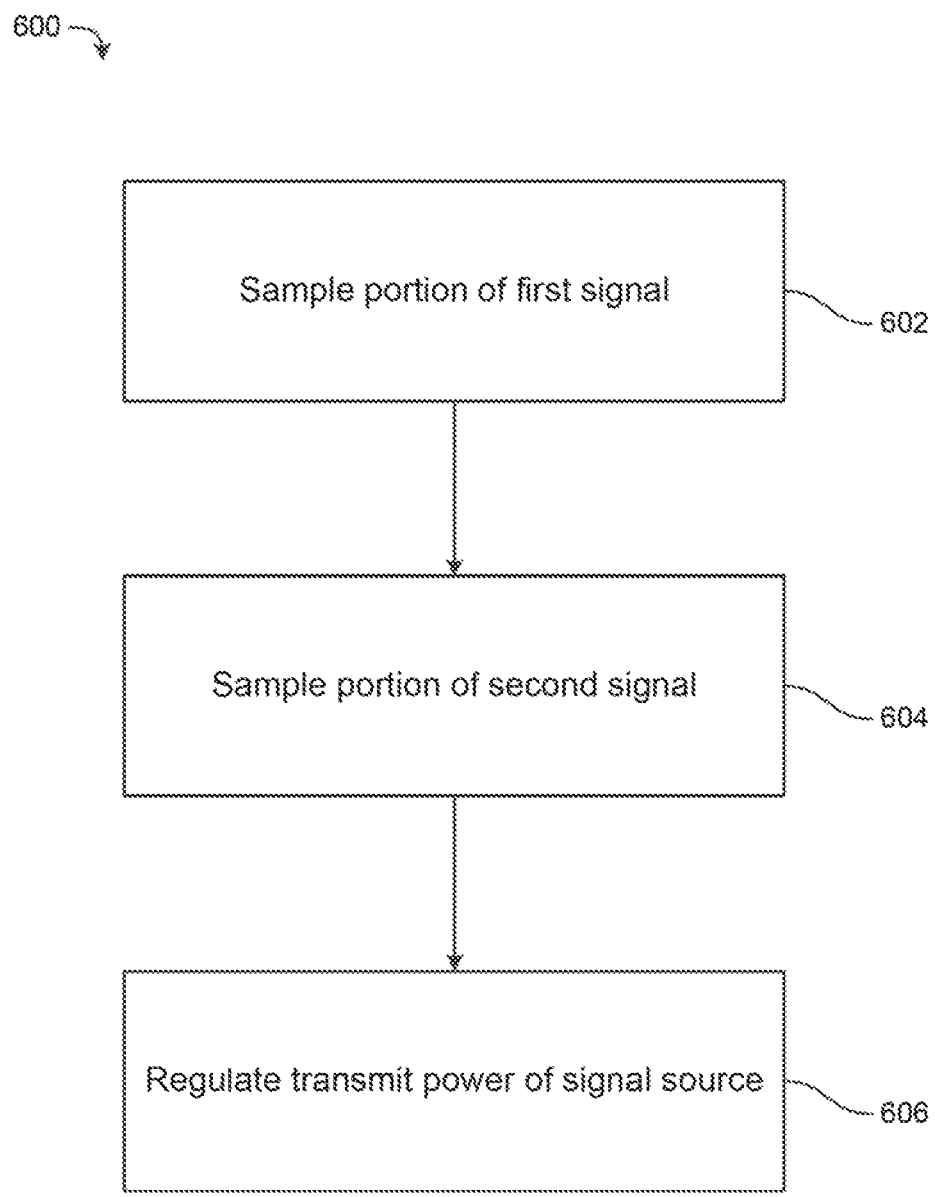
FIG. 6 is a flowchart of an example method for detecting human presence in proximity of a user device.

FIG. 6 is a flowchart of an example method 600 for detecting human presence in proximity of a user device. Although execution of method 600 is described below with reference to processor 302 of FIG. 3, it should be understood that execution of method 600 may be performed by other suitable devices, such as processors 402 and 502 of FIGS. 4 and 5, respectively. Method 600 may be implemented in the form of executable instructions stored on a machine-readable storage medium and/or in the form of electronic circuitry.

Method 600 may start in block 602, where processor 302 may sample a portion of a first signal. The first signal may be transmitted from a signal source to an antenna of a user device, such as user device 300. The portion of the first signal may be provided by a first directional coupler (e.g., coupler 114 of FIG. 1). Voltage, current, and/or other aspects of the portion of the first signal may be sampled.

Next, in block 604, processor 302 may sample a portion of a second signal. The second signal may be reflected from the antenna to the signal source of the user device. The portion of the second signal may be provided by a second directional coupler (e.g., coupler 104 of FIG. 1). Voltage, current, and/or other aspects of the portion of the second signal may be sampled.

Finally, in block 606, processor 302 may regulate, based on the sampled portions of the first and second signals, transmit power of the signal source. For example, processor 302 may determine that the strength (e.g., in terms of power, voltage, and/or current) of the signal portion provided by the second directional coupler is almost the same as that of the signal portion provided by the first directional coupler, and may conclude from such conditions that a human is close to the user device. Processor 302 may then reduce the transmit power of the signal source such that the user device complies with the FCC's SAR limits.

Figure 7:
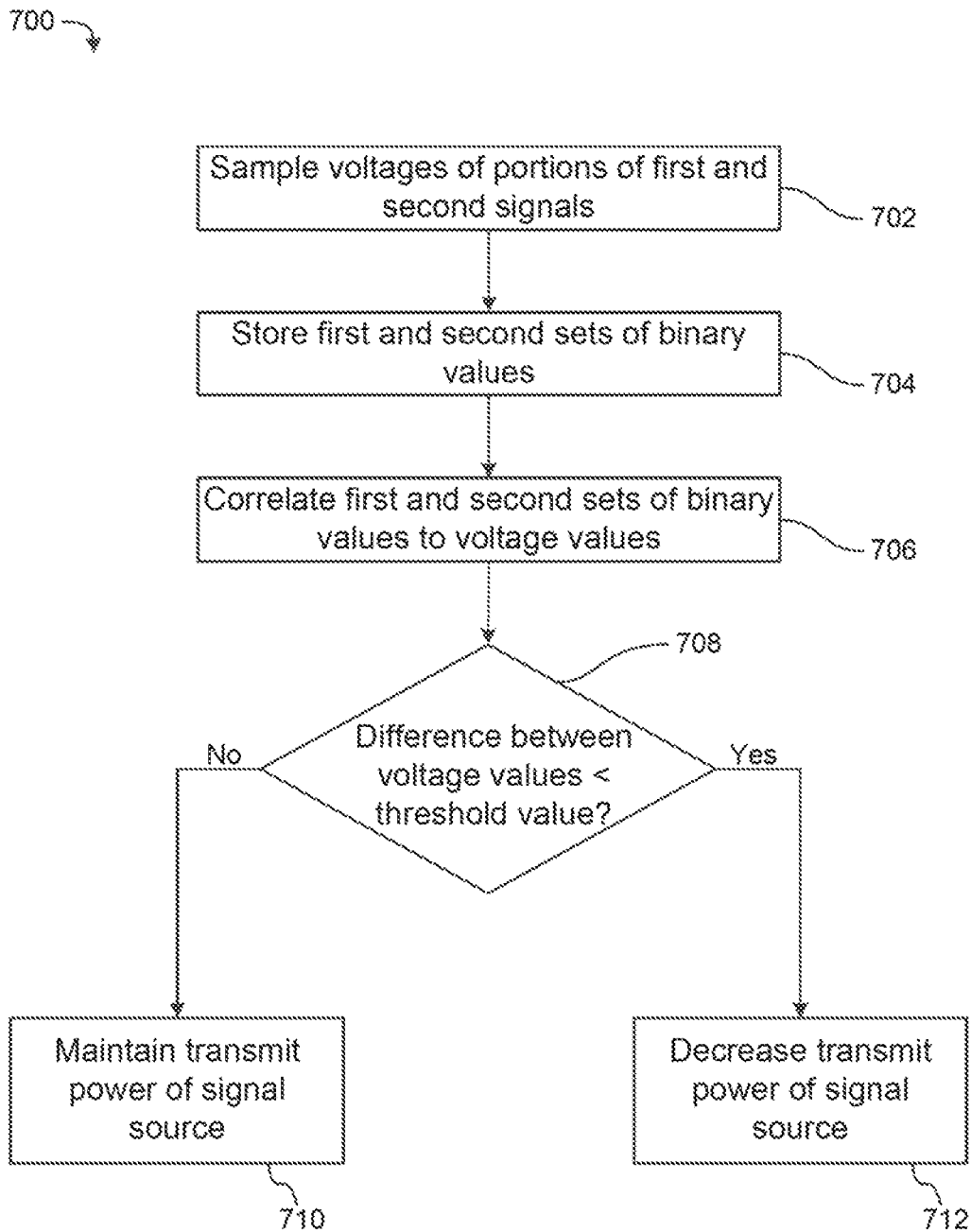
FIG. 7 is a flowchart of an example method for regulating transmit power of a signal source of a user device based on a difference between sampled voltage values.

FIG. 7 is a flowchart of an example method 700 for regulating transmit power of a signal source of a user device based on a difference between sampled voltage values. Although execution of method 700 is described below with reference to processor 402 of FIG. 4, it should be understood that execution of method 700 may be performed by other suitable devices, such as processor 302 of FIG. 3. Method 700 may be implemented in the form of executable instructions stored on a machine-readable storage medium and/or in the form of electronic circuitry.

Method 700 may start in block 702, where processor 402 may sample voltages of portions of first and second signals. The first signal may be transmitted from a signal source to an antenna of a user device, such as user device 400. The second signal may be reflected from the antenna to the signal source of the user device. The portion of the first signal may be provided by a first directional coupler (e.g., coupler 214), and the portion of the second signal may be provided by a second directional coupler (e.g., coupler 204).

In block 704, processor 402 may store a first set of binary values, corresponding to voltage samples of the portion of the first signal, and a second set of binary values, corresponding to voltage samples of the portion of the second signal. The equivalent decimal value of a set of binary values may represent a sampled voltage value. An equivalent decimal value may or may not be equal to its respective sampled voltage value, depending on the method(s) of sampling used in block 702.

Next, in block 706, processor 402 may correlate the first set of binary values to a forward voltage value, and correlate the second set of binary values to a reverse voltage value. The forward voltage value may be indicative of the amount of power in a signal transmitted from a signal source to an antenna of the user device. The reverse voltage value may be indicative of the amount of power reflected back from the antenna to the signal source.

In block 708, processor 402 may determine whether the difference between the voltage values is less than a threshold value. For example, processor 402 may calculate the difference between the forward voltage value and the reverse voltage value, and input the calculated difference and the threshold value into a comparator. If the difference between the voltage values is not less than the threshold value, method 700 may proceed to block 710, in which processor 402 may maintain transmit power of the signal source. In some implementations, processor 402 may maintain transmit power of the signal source if the difference between the voltage values equals the threshold value. In some implementations, processor 402 may increase transmit power of the signal source if the difference between the voltage values exceeds the threshold value.

If, in block 708, it is determined that the difference between the voltage values is less than the threshold value, method 700 may proceed to block 712, in which processor 402 may decrease transmit power of the signal source. In some implementations, processor 402 may decrease transmit power of the signal source if the difference between the voltage values equals the threshold value. A small difference (e.g., less than the threshold value) between the forward and reverse voltage values may indicate human presence near the user device, and thus processor 402 may decrease the transmit power of the signal source such that the user device complies with the FCC's SAR limits.

Figure 8:
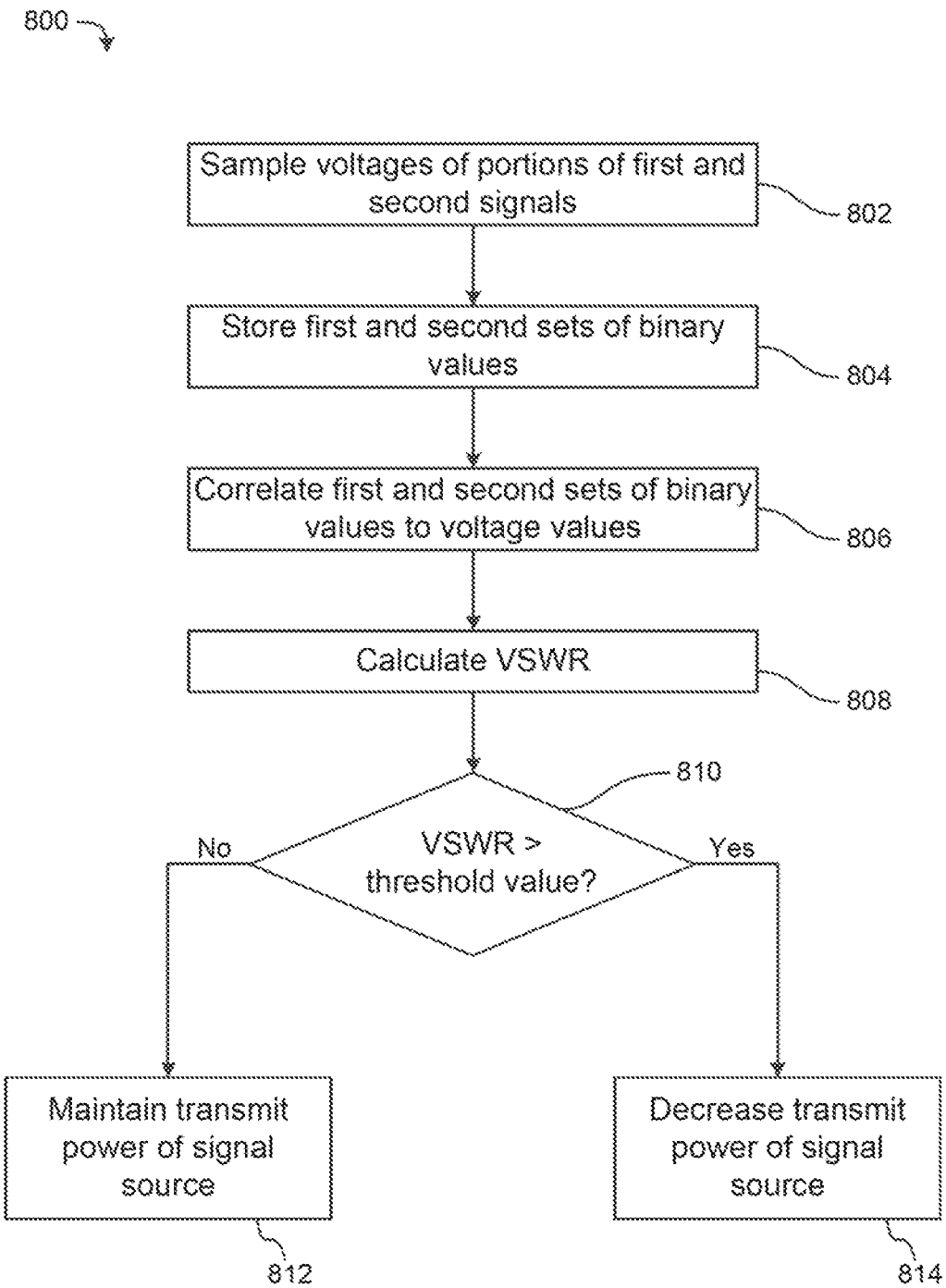
FIG. 8 is a flowchart of an example method for regulating transmit power of a signal source of a user device based on a voltage standing wave ratio.

FIG. 8 is a flowchart of an example method 800 for regulating transmit power of a signal source of a user device based on a VSWR. Although execution of method 800 is described below with reference to processor 502 of FIG. 5, it should be understood that execution of method 800 may be performed by other suitable devices, such as processor 302 of FIG. 3. Method 800 may be implemented in the form of executable instructions stored on a machine-readable storage medium and/or in the form of electronic circuitry.

Method 800 may start in block 802, where processor 502 may sample voltages of portions of first and second signals. The first signal may be transmitted from a signal source to an antenna of a user device, such as user device 500. The second signal may be reflected from the antenna to the signal source of the user device. The portion of the first signal may be provided by a first directional coupler (e.g., coupler 214), and the portion of the second signal may be provided by a second directional coupler (e.g., coupler 204).

In block 804, processor 502 may store a first set of binary values, corresponding to voltage samples of the portion of the first signal, and a second set of binary values, corresponding to voltage samples of the portion of the second signal. The equivalent decimal value of a set of binary values may represent a sampled voltage value. An equivalent decimal value may or may not be equal to its respective sampled voltage value, depending on the method(s) of sampling used in block 802.

Next, in block 806, processor 502 may correlate the first set of binary values to a forward voltage value, and correlate the second set of binary values to a reverse voltage value. The forward voltage value may be indicative of the amount of power in a signal transmitted from a signal source to an antenna of the user device. The reverse voltage value may be indicative of the amount of power reflected back from the antenna to the signal source.

In block 808, processor 502 may calculate a VSWR using the forward voltage value and the reverse voltage value. In some implementations, the VSWR may be calculated by dividing the sum of the forward and reverse voltage values by the difference between the forward and reverse voltage values.

In block 810, processor 502 may determine whether the VSWR calculated in block 808 exceeds a threshold value. For example, processor 502 may input the VSWR and the threshold value into a comparator. If the VSWR does not exceed the threshold value, method 800 may proceed to block 812, in which processor 502 may maintain transmit power of the signal source. In some implementations, processor 502 may maintain transmit power of the signal source if the VSWR equals the threshold value. In some implementations, processor 502 may increase transmit power of the signal source if the VSWR does not exceed the threshold value.

If, in block 810, it is determined that the VSWR exceeds the threshold value, method 800 may proceed to block 814, in which processor 502 may decrease transmit power of the signal source. In some implementations, processor 502 may decrease transmit power of the signal source if the VSWR is equal to the threshold value. The VSWR may be large (e.g., greater than the threshold value) when the forward and reverse voltage values are about the same, which may indicate human presence near the user device, and thus processor 502 may decrease the transmit power of the signal source such that the user device complies with the FCC's SAR limits.

The foregoing disclosure describes sampling signals within user devices and regulating transmit power based on sampled signals. Example implementations described herein enable user devices to detect human presence in their proximity and decrease transmit power accordingly to comply with the FCC's SAR limits.

I claim:

1. A system for detecting human presence in proximity of a user device, the system comprising:
   a first directional coupler having a first port communicatively coupled to an antenna, wherein a portion of a signal passing from a second port of the first directional coupler to the first port of the first directional coupler is provided at a third port of the first directional coupler;
   a second directional coupler having a first port communicatively coupled to a signal source, and a second port communicatively coupled to the second port of the first directional coupler, wherein a portion of a signal passing from the second port of the second directional coupler to the first port of the second directional coupler is provided at a third port of the second directional coupler; and
   a processor to regulate, based on a comparison of the portion of the signal at the third port of the first coupler and the portion of the signal at the third port of the second directional coupler, a transmit power of the signal source.

2. The system of claim 1, further comprising:
   a first analog-to-digital converter (ADC) to sample voltage of the portion of the signal at the third port of the first directional coupler; and
   a second ADC to sample voltage of the portion of the signal at the third port of the second directional coupler;
   wherein:
      the first ADC and the second ADC are communicatively coupled to the processor; and
      the processor is further to store a first set of binary values, corresponding to voltage samples of the portion of the signal at the third port of the first directional coupler, and a second set of binary values, corresponding to voltage samples of the portion of the signal at the third port of the second directional coupler.

3. The system of claim 2, wherein the processor is further to:
   correlate the first set of binary values to a forward voltage value; and
   correlate the second set of binary values to a reverse voltage value.

4. The system of claim 3, wherein the processor is further to decrease the transmit power of the signal source if the difference between the forward voltage value and the reverse voltage value is less than a threshold value.

5. The system of claim 3, wherein the processor is further to:
    calculate a voltage standing wave ratio (VSWR) using the forward voltage value and the reverse voltage value; and
    decrease the transmit power of the signal source if the VSWR exceeds a threshold value.

6. A non-transitory machine-readable storage medium encoded with instructions executable by a processor of a user device for detecting human presence in proximity of the user device, the machine-readable storage medium comprising:
    instructions to sample a portion of a first signal transmitted from a signal source to an antenna of the user device, wherein the portion of the first signal is provided by a first directional coupler;
    instructions to sample a portion of a second signal reflected from the antenna to the signal source, wherein the portion of the second signal is provided by a second directional coupler; and
    instructions to regulate, based on a comparison of the portion of the first signal that is sampled and the portion of the second signal that is sampled, a transmit power of the signal source.

7. The non-transitory machine-readable storage medium of claim 6, further comprising:
    instructions to sample a voltage of the portion of the first signal;
    instructions to sample a voltage of the portion of the second signal; and
    instructions to store a first set of binary values, corresponding to the voltage of the portion of the first signal that is sampled, and a second set of binary values, corresponding to the voltage of the portion of the second signal that is sampled.

8. The non-transitory machine-readable storage medium of claim 7, further comprising:
    instructions to correlate the first set of binary values to a forward voltage value; and
    instructions to correlate the second set of binary values to a reverse voltage value.

9. The non-transitory machine-readable storage medium of claim 8, further comprising:
    instructions to decrease a transmit power of the signal source if the difference between the forward voltage value and the reverse voltage value is less than a threshold value.

10. The non-transitory machine-readable storage medium of claim 8, further comprising:
    instructions to calculate a voltage standing wave ratio (VSWR) using the forward voltage value and the reverse voltage value; and
    instructions to decrease the transmit power of the signal source if the VSWR exceeds a threshold value.

11. A method for detecting human presence in proximity of a user device, the method comprising:
    sampling a portion of a first signal transmitted from a signal source to an antenna of the user device, wherein the portion of the first signal is provided by a first directional coupler;
    sampling a portion of a second signal reflected from the antenna to the signal source, wherein the portion of the second signal is provided by a second directional coupler; and
    regulating, based on a comparison of the portion of the first signal that is sampled and the portion of the second signal that is sampled, a transmit power of the signal source.

12. The method of claim 11, wherein the sampling the portion of the first signal comprises sampling a voltage of the portion of the first signal and the sampling the portion of the second signal comprises sampling a voltage of the portion of the second signal, the method further comprising:
    storing a first set of binary values, corresponding to the voltage of the portion of the first signal that is sampled, and a second set of binary values, corresponding to the voltage of the portion of the second signal that is sampled.

13. The method of claim 12, further comprising:
    correlating the first set of binary values to a forward voltage value; and
    correlating the second set of binary values to a reverse voltage value.

14. The method of claim 13, wherein regulating the transmit power of the signal source comprises decreasing the transmit power of the signal source if the difference between the forward voltage value and the reverse voltage value is less than a threshold value.

15. The method of claim 13, further comprising:
    calculating a voltage standing wave ratio (VSWR) using the forward voltage value and the reverse voltage value, wherein regulating transmit power of the signal source comprises decreasing the transmit power of the signal source if the VSWR exceeds a threshold value.

* * * * *